(12) United States Patent
Addanki et al.

(10) Patent No.: US 9,699,001 B2
(45) Date of Patent: Jul. 4, 2017

(54) SCALABLE AND SEGREGATED NETWORK VIRTUALIZATION

(71) Applicant: BROCADE COMMUNICATIONS SYSTEMS, INC., San Jose, CA (US)

(72) Inventors: Venkata R. K. Addanki, Cupertino, CA (US); Sadasivudu Malladi, San Jose, CA (US); Chi L. Chong, Fremont, CA (US); Kiran K. Gavini, Mountain View, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 211 days.

(21) Appl. No.: 14/299,206

(22) Filed: Jun. 9, 2014

(65) Prior Publication Data

US 2014/0362859 A1    Dec. 11, 2014

Related U.S. Application Data

(60) Provisional application No. 61/833,376, filed on Jun. 10, 2013.

(51) Int. Cl.
*H04L 12/46* (2006.01)
*H04L 12/741* (2013.01)
(52) U.S. Cl.
CPC ........ *H04L 12/465* (2013.01); *H04L 12/4641* (2013.01); *H04L 45/745* (2013.01)
(58) Field of Classification Search
None
See application file for complete search history.

(56) References Cited

U.S. PATENT DOCUMENTS

| 829,529 | A | 8/1906 | Keathley |
| 5,390,173 | A | 2/1995 | Spinney |
| 5,802,278 | A | 9/1998 | Isfeld |
| 5,878,232 | A | 3/1999 | Marimuthu |
| 5,959,968 | A | 9/1999 | Chin |

(Continued)

FOREIGN PATENT DOCUMENTS

| CN | 1735062 | 2/2006 |
| CN | 101064682 | 10/2007 |

(Continued)

OTHER PUBLICATIONS

Bari et al, Data Center Network Virtualization: A survery, Sep. 20, 2012, IEEE Communications Surveys and Tutorials, pp. 909-928.*

(Continued)

*Primary Examiner* — Michael Thier
*Assistant Examiner* — Kent Krueger
(74) *Attorney, Agent, or Firm* — Shun Yao; Park, Vaughan, Fleming & Dowler LLP

(57) ABSTRACT

One embodiment of the present invention provides a switch. The switch includes a virtual network module and a forwarding module. The virtual network module includes a global virtual local area network (VLAN) tag in a packet. The global VLAN tag is mapped to an edge VLAN tag in the packet and is associated with a datacenter domain. The datacenter domain indicates a set of ports associated with a datacenter. The forwarding module identifies an egress edge port for the packet based on the global VLAN tag.

25 Claims, 13 Drawing Sheets

(56) References Cited

U.S. PATENT DOCUMENTS

| | | |
|---|---|---|
| 5,973,278 A | 10/1999 | Wehrill, III |
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,633,761 B1 | 10/2003 | Singhal |
| 6,771,610 B1 | 8/2004 | Seaman |
| 6,870,840 B1 | 3/2005 | Hill |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B2 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Venkataraman et al. |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,619,788 B1 | 12/2013 | Sankaran |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,995,272 B2 | 3/2015 | Agarwal |
| 9,178,793 B1 | 11/2015 | Marlow |
| 9,438,447 B2 | 9/2016 | Basso |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0174706 A1 | 9/2003 | Shankar |
| 2003/0189905 A1 | 10/2003 | Lee |
| 2003/0208616 A1 | 11/2003 | Laing |
| 2003/0216143 A1 | 11/2003 | Roese |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0122979 A1 | 6/2005 | Gross |

(56) References Cited

U.S. PATENT DOCUMENTS

| | | |
|---|---|---|
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0098589 A1 | 5/2006 | Kreeger |
| 2006/0126511 A1 | 6/2006 | Youn |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2007/0036178 A1 | 2/2007 | Hares |
| 2007/0053294 A1 | 3/2007 | Ho |
| 2007/0061817 A1 | 3/2007 | Atkinson |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0226214 A1 | 9/2007 | Smits |
| 2007/0258449 A1 | 11/2007 | Bennett |
| 2007/0274234 A1 | 11/2007 | Kubota |
| 2007/0289017 A1 | 12/2007 | Copeland, III |
| 2008/0052487 A1 | 2/2008 | Akahane |
| 2008/0056135 A1 | 3/2008 | Lee |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245137 A1 | 10/2009 | Hares |
| 2009/0245242 A1 | 10/2009 | Carlson |
| 2009/0246137 A1 | 10/2009 | Hadida |
| 2009/0252049 A1 | 10/2009 | Ludwig |
| 2009/0252061 A1 | 10/2009 | Small |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2009/0328392 | 12/2009 | Tripathi |
| 2010/0027420 A1 | 2/2010 | Smith |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165876 A1 | 7/2010 | Shukla |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290464 A1 | 11/2010 | Assarpour |

(56) References Cited

U.S. PATENT DOCUMENTS

| | | |
|---|---|---|
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1* | 3/2011 | Waldrop ............ G06Q 30/0611 370/389 |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe et al. |
| 2011/0142062 A1 | 6/2011 | Wang |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva et al. |
| 2012/0033668 A1 | 2/2012 | Humphries |
| 2012/0033669 A1 | 2/2012 | Mohandas |
| 2012/0033672 A1 | 2/2012 | Page |
| 2012/0063363 A1 | 3/2012 | Li |
| 2012/0075991 A1 | 3/2012 | Sugita |
| 2012/0099567 A1 | 4/2012 | Hart et al. |
| 2012/0099602 A1 | 4/2012 | Nagapudi |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0230225 A1 | 9/2012 | Matthews |
| 2012/0243539 A1 | 9/2012 | Keesara |
| 2012/0250502 A1 | 10/2012 | Brolin |
| 2012/0275297 A1 | 11/2012 | Subramanian |
| 2012/0275347 A1 | 11/2012 | Banerjee |
| 2012/0287785 A1 | 11/2012 | Kamble |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0136123 A1 | 5/2013 | Ge |
| 2013/0148546 A1 | 6/2013 | Eisenhauer |
| 2013/0194914 A1 | 8/2013 | Agarwal |
| 2013/0219473 A1 | 8/2013 | Schaefer |
| 2013/0223221 A1 | 8/2013 | Xu |
| 2013/0250951 A1 | 9/2013 | Koganti |
| 2013/0259037 A1 | 10/2013 | Natarajan |
| 2013/0272135 A1 | 10/2013 | Leong |
| 2013/0301425 A1 | 11/2013 | Udutha et al. |
| 2013/0301642 A1 | 11/2013 | Radhakrishnan |
| 2013/0322427 A1 | 12/2013 | Stiekes |
| 2013/0346583 A1 | 12/2013 | Low |
| 2014/0025736 A1 | 1/2014 | Wang |
| 2014/0044126 A1 | 2/2014 | Sabhanatarajan |
| 2014/0059225 A1 | 2/2014 | Gasparakis |
| 2014/0086253 A1 | 3/2014 | Yong |
| 2014/0105034 A1 | 4/2014 | Sun |
| 2014/0258446 A1 | 9/2014 | Bursell |
| 2014/0269720 A1 | 9/2014 | Srinivasan |
| 2014/0269733 A1 | 9/2014 | Venkatesh |
| 2014/0355477 A1 | 12/2014 | Velayudhan et al. |
| 2015/0010007 A1 | 1/2015 | Matsuhira |
| 2015/0030031 A1 | 1/2015 | Zhou |
| 2015/0143369 A1 | 5/2015 | Zheng |
| 2015/0172098 A1 | 6/2015 | Agarwal |

FOREIGN PATENT DOCUMENTS

| | | |
|---|---|---|
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102415065 | 4/2012 |

(56) References Cited

FOREIGN PATENT DOCUMENTS

| | | |
|---|---|---|
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 2001167 A1 | 8/2007 |
| EP | 1916807 A2 | 4/2008 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2014031781 | 2/2014 |

OTHER PUBLICATIONS

Office Action dated Jun. 18, 2015, U.S. Appl. No. 13/098,490, filed May 2, 2011.
Office Action dated Jun. 16, 2015, U.S. Appl. No. 13/048,817, filed Mar. 15, 2011.
Touch, J. et al., 'Transparent Interconnection of Lots of Links (TRILL): Problem and Applicability Statement', May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438 filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
'RBridges: Base Protocol Specification', IETF Draft, Perlman et al., Jun. 26, 2009.
Switched Virtual Networks. 'Internetworking Moves Beyond Bridges and Routers' Data Communications, McGraw Hill. New York, US, vol. 23, No. 12, Sep. 1, 1994, pp. 66-70,72,74, XP000462385 ISSN: 0363-6399.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.

(56) References Cited

OTHER PUBLICATIONS

Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004, pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998, XP002135272 Retrieved from the Internet: URL:ftp://ftp.isi.edu/in-notes/rfc2338.txt [retrieved on Apr. 10, 2000].
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-na rten-n vo3-over l ay-problem -statement-01', Oct. 31, 2011.
Office Action for U.S. Appl. No. 13/042,259, filed Mar. 7, 2011, from Jaroenchonwanit, Bunjob, dated Jan. 16, 2014.
Office Action for U.S. Appl. No. 13/087,239, filed Apr. 14, 2011, dated May 22, 2013.
Office Action for U.S. Appl. No. 13/092,724, filed Apr. 22, 2011, dated Jul. 16, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
Office action dated Aug. 4, 2014, U.S. Appl. No. 13/050,102, filed Mar. 17, 2011.
Perlman, Radia et al., 'RBridges: Base Protocol Specification; Draft-ietf-trill-rbridge-protocol-16.txt', Mar. 3, 2010, pp. 1-117.
An Introduction to Brocade VCS Fabric Technology, BROCADE white paper, http://community.brocade.com/docs/DOC-2954, Dec. 3, 2012.
U.S. Appl. No. 13/030,806 Office Action dated Dec. 3, 2012.
Office Action dated Apr. 9, 2014, U.S. Appl. No. 13/092,752, filed Apr. 22, 2011.
Brocade Brocade Unveils the Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.

(56) References Cited

OTHER PUBLICATIONS

Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Office Action for U.S. Appl. No. 13/092,887, dated Jan. 6, 2014.
Office Action for U.S. Appl. No. 13/030,806, filed Feb. 18, 2011, dated Dec. 3, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, dated Dec. 2, 2012.
Office Action for U.S. Appl. No. 13/087,239, filed Apr. 14, 2011, dated Dec. 5, 2012.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 7, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Office Action for U.S. Appl. No. 14/577,785, filed Dec. 19, 2014, dated Apr. 13, 2015.
Office Action for U.S. Appl. No. 13/425,238, filed Mar. 20, 2012, dated Mar. 12, 2015.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.

(56) References Cited

OTHER PUBLICATIONS

Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438 filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.

\* cited by examiner

| TABLE 252 | | | |
|---|---|---|---|
| TAG 222 OF VLAN 152 | TENANT ID 282 | ID 272 OF DCD 172 | GLOBAL VLAN TAG 231 |
| TAG 224 OF VLAN 154 | TENANT ID 282 | ID 272 OF DCD 172 | GLOBAL VLAN TAG 232 |
| TAG 224 OF VLAN 154 | TENANT ID 282 | ID 272 OF DCD 174 | GLOBAL VLAN TAG 233 |
| TAG 222 OF VLAN 152 | TENANT ID 284 | ID 274 OF DCD 174 | GLOBAL VLAN TAG 234 |
| TAG 224 OF VLAN 154 | TENANT ID 284 | ID 274 OF DCD 174 | GLOBAL VLAN TAG 235 |
| TAG 224 OF VLAN 154 | TENANT ID 286 | ID 274 OF DCD 174 | GLOBAL VLAN TAG 236 |

| TABLE 254 OF SWITCH 103 | | |
|---|---|---|
| GLOBAL VLAN TAG 231 | ADD. INFO 241 | IVID 261 |
| GLOBAL VLAN TAG 232 | ADD. INFO 242 | IVID 262 |
| GLOBAL VLAN TAG 233 | ADD. INFO 243 | IVID 263 |
| GLOBAL VLAN TAG 234 | | IVID 264 |
| GLOBAL VLAN TAG 235 | ADD. INFO 244 | IVID 265 |
| GLOBAL VLAN TAG 236 | ADD. INFO 245 | IVID 266 |

| TABLE 256 OF SWITCH 105 | | |
|---|---|---|
| GLOBAL VLAN TAG 231 | ADD. INFO 241 | IVID 267 |
| GLOBAL VLAN TAG 232 | ADD. INFO 247 | IVID 262 |
| GLOBAL VLAN TAG 233 | ADD. INFO 244 | IVID 263 |
| GLOBAL VLAN TAG 234 | ADD. INFO 248 | IVID 268 |
| GLOBAL VLAN TAG 235 | | IVID 261 |
| GLOBAL VLAN TAG 236 | ADD. INFO 246 | IVID 269 |

FIG. 2C

SCALABLE AND SEGREGATED NETWORK VIRTUALIZATION

RELATED APPLICATIONS

This application claims the benefit of U.S. Provisional Application No. 61/833,376, titled "VCS Datacenter Domain for Multi-Tenant Network Virtualization, Segregation and Defined VM Migration," by inventors Kiran Addanki, Sada Malladi, Chi Lung Chong, and Kiran Gavini, filed 10 Jun. 2013, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, the disclosure of which is incorporated by reference herein.

BACKGROUND

Field

The present disclosure relates to communication networks. More specifically, the present disclosure relates to scalable network virtualization.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as support for multi-tenancy, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While a fabric switch brings many desirable features to a network, some issues remain unsolved in facilitating scalable and segregated network virtualization for a large number of tenants.

SUMMARY

One embodiment of the present invention provides a switch. The switch includes a virtual network module and a forwarding module. The virtual network module includes a global virtual local area network (VLAN) tag in a packet. The global VLAN tag is mapped to an edge VLAN tag in the packet and is associated with a datacenter domain. The datacenter domain indicates a set of ports associated with a datacenter. The forwarding module identifies an egress edge port for the packet based on the global VLAN tag.

In a variation on this embodiment, the global VLAN tag is mapped to an internal virtual identifier, which is internal and local to the switch. The forwarding module further identifies the egress edge port based on a mapping between the egress port and the internal virtual identifier.

In a variation on this embodiment, the edge VLAN tag is associated with a virtual machine. The virtual machine is allowed to migrate to the set of ports indicated by the datacenter domain.

In a variation on this embodiment, the packet does not include the edge VLAN tag, and the global VLAN tag is mapped to a media access control (MAC) address in the packet.

In a variation on this embodiment, the global VLAN tag is further mapped to one or more of: (i) a tenant identifier, which is information that can distinguish between tenants, and (ii) an identifier of the datacenter domain.

In a variation on this embodiment, the switch also includes a tag management module which generates the global VLAN tag based on the datacenter domain and the edge VLAN tag.

In a variation on this embodiment, the switch also includes a fabric switch management module which maintains a membership in a fabric switch. The fabric switch accommodates a plurality of member switches and operates as a single switch.

In a further variation, the fabric switch management module includes the global VLAN tag in a notification message for the member switches. The global VLAN tag is generated based on the datacenter domain and the edge VLAN tag.

In a further variation, the switch also includes a port profile module which applies a port profile to the ingress port of the packet in response to identifying the source MAC address of the packet in a port profile.

In a further variation, the port profile is in a port profile set associated with the datacenter domain.

BRIEF DESCRIPTION OF THE FIGURES

FIG. 2C illustrates exemplary tables comprising mappings of global VLANs, in accordance with an embodiment of the present invention.

In the figures, like reference numerals refer to the same figure elements.

DETAILED DESCRIPTION

Figure 1:
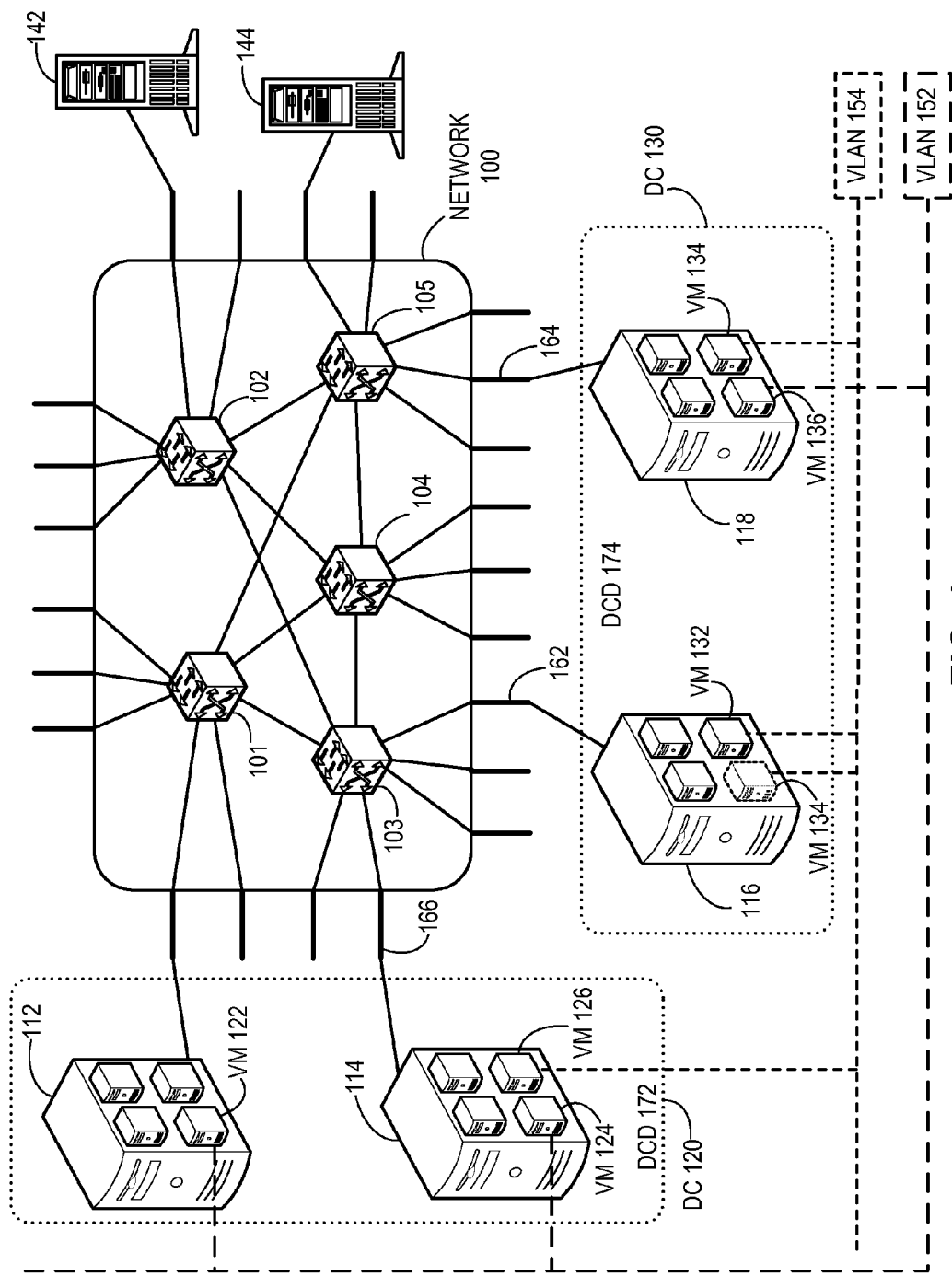
FIG. 1 illustrates an exemplary provider network with scalable and segregated network virtualization support, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating scalable and segregated network virtualization is solved by mapping an edge virtual local area network (VLAN) to a large-scale global VLAN in a provider network. As a result, a respective tenant in a datacenter (DC) associated with the provider network can reuse the same edge VLAN used by another tenant, and therefore, can use a large number edge VLANs in a scalable way. Furthermore, global VLANs can be distinct for a respective datacenter coupled the provider network, thereby allowing segregated network virtualization for different datacenters coupled to the same provider network. A global VLAN can be computed based on a datacenter domain identifier and an edge VLAN tag.

With existing technologies, a provider network typically uses a separate VLAN tag, which is referred to as service tag or S-tag, in addition to the edge VLAN tag (can also be referred to as customer tag or C-tag). However, since the length of an S-tag is typically the same as the length of a C-tag, the number of VLANs supported in the provider network still remains limited. On the other hand, the S-tag and the C-tag can be used together as a single identifier to extend the number of VLANs supported in the provider network. However, such identifier may not distinguish between datacenters coupled to the provider network and segregate the same edge VLANs of different datacenters.

To solve this problem, a respective switch in the provider network maps a respective edge VLAN of a respective tenant of a respective datacenter to a unique and distinct global VLAN. The number of supported global VLANs can be significantly larger than the number of edge VLANs. In some embodiments, the number of bits used to represent edge VLAN tags and global VLAN tags are 12 and 24, respectively. This global VLAN is distinct among edge VLANs of different tenants and datacenters. For example, the same edge VLAN used by two tenants are mapped to two distinct global VLANs in the provider network. As a result, a tenant can use an edge VLAN tag used by another tenant, and therefore, can use a large number of edge VLANs (e.g., up to the available number of edge VLANs represented by 12 bits). This global VLAN can be included in the inter-switch packets forwarded in the provider network. In some embodiments, this global VLAN is removed when the packets leave the provider network.

Furthermore, the same edge VLAN used at two different datacenters is mapped to two unique and distinct global VLANs. As a result, if a tenant's network is distributed in two datacenters and the tenant reuses the same edge VLAN, the traffic from different datacenters are segregated in the same provider network. Moreover, a global VLAN can be persistent in the provider network and is included in the inter-switch packets forwarded in the provider network. For example, if a virtual machine (VM) moves within a datacenter, the edge VLAN of the migrated virtual machine maps to the same global VLAN. In some embodiments, a respective switch in the provider network includes one or more port profiles comprising port configurations (e.g., edge and global VLAN policies), and applies a port profile upon detecting traffic from an associated end device.

In some embodiments, the provider network is a fabric switch, and a respective switch in the provider network is a member switch of the fabric switch. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some embodiments, a respective switch in the fabric switch is an Internet Protocol (IP) routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

In this disclosure, the term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

The term "end device" can refer to any device external to the provider network, which can be a fabric switch. Examples of an end device include, but are not limited to, a host machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the fabric switch.

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a TRILL RBridge, or a fabric switch comprising a plurality of similar or heterogeneous smaller physical and/or virtual switches.

The term "edge port" refers to a port in a provider network which exchanges data frames with a network device outside of the provider network (i.e., an edge port is not used for exchanging data frames with another switch of the provider network). The provider network can be a fabric switch and the switches in the provider network can be member switches of the fabric switch. The term "inter-switch port" refers to a port which sends/receives data frames among the switches of the provider network. The terms "interface" and "port" are used interchangeably.

The term "VLAN" is used in a generic sense and refers to any virtualized network. The term "VLAN" refers to a virtualized network within a physical network. A VLAN isolates the virtualized network so that packets are only forwarded within the VLAN. A VLAN associated with a packet received from an edge port of a switch can be referred to as an edge VLAN and a corresponding identifier or tag can be referred to as an edge VLAN tag. The terms "identifier" and "tag" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram."

Network Architecture

FIG. 1 illustrates an exemplary provider network with scalable and segregated network virtualization support, in accordance with an embodiment of the present invention. As illustrated in FIG. 1A, a network 100 includes switches 101, 102, 103, 104, and 105. Switches 102 and 105 are coupled to end devices 142 and 144, respectively. Network 100 can be a provider network, which provides connectivity to a datacenter. A datacenter 120 is coupled with network 100 via switches 101 and 103. Similarly, a datacenter 130 is coupled with network 100 via switches 103 and 105.

Datacenter 120 includes host machines 112 and 114, each of which hosts one or more virtual machines (i.e., one or more virtual machines run on host machines 112 and 114). For example, host machine 112 hosts virtual machine 122, and host machine 114 hosts virtual machines 124 and 126. Similarly, datacenter 130 includes host machines 116 and 118, each of which hosts one or more virtual machines. For example, host machine 116 hosts virtual machine 132, and host machine 118 hosts virtual machines 134 and 136. Virtual machines 122 and 124 of datacenter 120, and virtual machine 136 of datacenter 130 is in edge VLAN 152. Virtual machine 126 of datacenter 120, and virtual machines 132 and 134 of datacenter 130 is in edge VLAN 154.

In some embodiments, network 100 is a fabric switch and a respective switch in network 100 is a member switch of the fabric switch. A fabric switch is formed using a number of smaller physical switches. The automatic configuration capability provided by the control plane running on a respective member switch allows any number of switches to be connected in an arbitrary topology without requiring tedious manual configuration of the ports and links. This feature makes it possible to use many smaller, inexpensive switches to construct a large cluster switch, which can be viewed as a single switch externally.

In some embodiments, fabric switch 100 is a TRILL network and a respective member switch of fabric switch 100, such as switch 105, is a TRILL RBridge. In some further embodiments, fabric switch 100 is an IP network and a respective member switch of fabric switch 100, such as switch 105, is an IP-capable switch, which calculates and maintains a local IP routing table (e.g., a routing information base or RIB), and is capable of forwarding packets based on its IP addresses.

Switches in fabric switch 100 use edge ports to communicate with end devices (e.g., non-member switches) and inter-switch ports to communicate with other member switches. For example, switch 105 is coupled to end device 144 via an edge port and to switches 101, 102, and 104 via inter-switch ports and one or more links. Data communication via an edge port can be based on Ethernet and via an inter-switch port can be based on IP and/or TRILL protocol. It should be noted that control message exchange via inter-switch ports can be based on a different protocol (e.g., Internet Protocol (IP) or Fibre Channel (FC) protocol).

During operation, a datacenter is represented as a datacenter domain (DCD). A datacenter domain represents a set of associations between edge VLAN and global VLAN. Datacenter domains allow the proper mapping between edge VLAN and global VLAN. Datacenter domains also ensure that migrating virtual machines are associated with the correct global VLAN. The virtual machines that need connectivity are in the same datacenter domain. A global VLAN can be computed based on the datacenter domain identifier and an edge VLAN tag. To achieve segregation of virtualized networks between different datacenters, a switch of the provider network creates a datacenter domain, assigns ports to the datacenter domain, associates global VLANs with the corresponding virtual machines, and isolates data packets belonging to these global VLANs. These virtual machines and their network policies are often configured in portgroups in a virtual machine manager (e.g., a vCenter). In some embodiments, portgroups from a respective virtual machine manager associated with a corresponding datacenter domain.

In some embodiments, a datacenter manager creates a corresponding datacenter domain. For example, the datacenter managers of datacenters 120 and 130, respectively, create corresponding datacenter domains 172 and 174, respectively. A datacenter domain be assigned a unique identifier, and include one or more ports of network 100 among which a virtual machine can migrate. These ports can be from an individual switch or from a plurality of switches in network 100. For example, datacenter domain 174 includes port 162 of switch 103 and port 164 of switch 105. This allows a virtual machine, such as virtual machine 134, to migrate between ports 162 and 164 (i.e., between host machines 116 and 118). As a result, virtual machine 134 may not migrate to a port, such as port 166, of a different datacenter domain 172. Ports 162 and 164 can be manually included in datacenter domain 174 or by a datacenter manager of datacenter 130.

If a plurality of datacenters participates in the same virtualized network without segregation, the same global VLAN can span the plurality of datacenters. For example, if datacenters 120 and 130 participates in edge VLAN 154 without segregation, the same global VLAN can be mapped to edge VLAN 154 for both datacenters 120 and 130. This global VLAN spans both datacenters 120 and 130. This global VLAN can be mapped to both datacenters 120 and 130, or can be created and mapped to datacenters 120 and 130 independently. This also allows partial segregation. For example, if edge VLAN 152 requires segregation, separate global VLANs can still be mapped to edge VLAN 152 for datacenters 120 and 130. In this way, packets of edge VLAN 152 is segregated for datacenters 120 and 130, but packets of edge VLAN 154 are not segregated in network 100.

With existing technologies, network 100 typically uses a separate VLAN tag, which is referred to as service tag or S-tag, in addition to the edge VLAN tag (can also be referred to as customer tag or C-tag). However, since the length of an S-tag is typically the same as the length of a C-tag, the number of VLANs supported in the provider network still remains limited. On the other hand, the S-tag and the C-tag can be used together as a single identifier to extend the number of VLANs supported in network 100. However, such identifier may not distinguish between datacenters 120 and 130 coupled to network 100 and segregate the same edge VLANs of different datacenters. For example, tags of edge VLAN 152 of datacenters 120 and 130 can be mapped to the same identifier in network 100 and traffic of edge VLAN 152 may not be segregated for datacenters 120 and 130.

To solve this problem, a respective switch in network 100 maps edge VLANs 152 and 154 to global VLANs. The global VLANs are distinct among edge VLANs of different tenants and datacenters. The number of supported global VLANs can be significantly larger than the number of edge VLANs in network 100. In some embodiments, the number of bits used to represent edge VLAN tags and global VLAN tags are 12 and 24, respectively. For example, edge VLAN 152 used by two tenants are mapped to two distinct global VLANs in network 100. As a result, a respective tenant can use edge VLAN 152, and therefore, can use a large number of edge VLANs (e.g., up to the available number of edge VLANs represented by 12 bits). The global VLAN mapped to edge VLAN 152 can be included in the packets within the provider network. As a result, switches in network 100 segregates these packets of the global VLAN from other traffic. In some embodiments, this global VLAN is removed when the packets leave network 100.

Furthermore, the same edge VLAN 152 used at datacenters 120 and 130 (i.e., configured in datacenter domain 172 and 174, respectively) is mapped to two distinct global VLANs. As a result, for the same edge VLAN 152, the traffic from different datacenters is segregated in network 100. Moreover, a global VLAN can be persistent in network 100 and is included in the packets forwarded in network 100. For example, if virtual machine 134 moves to host machine 116 in datacenter domain 174 (denoted with dotted lines), virtual machine 134 remains associated with edge VLAN 154 and maps to the same global VLAN.

Global VLAN Mappings

Figure 2A:
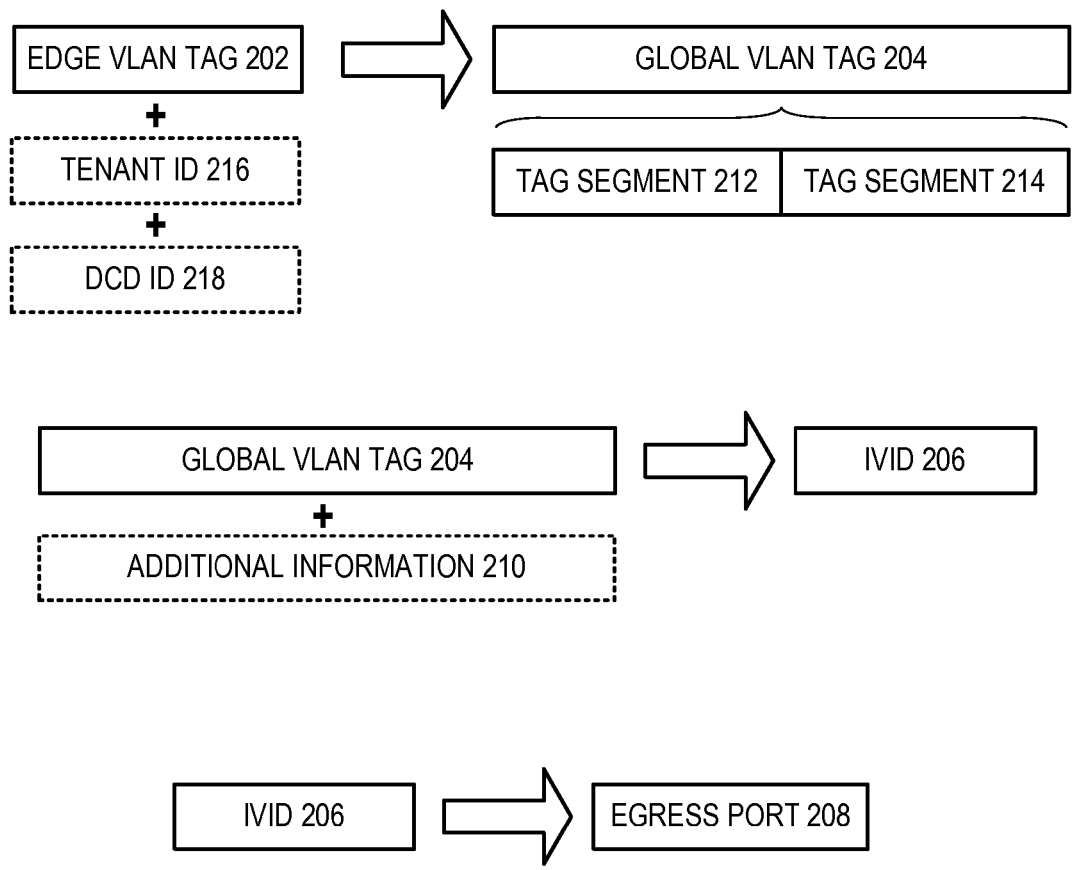
FIG. 2A illustrates exemplary mappings of global virtual local area networks (VLANs), in accordance with an embodiment of the present invention.

In some embodiments, in the example in FIG. 1, switch 103 is coupled to datacenters 120 and 130, and is configured for edge VLANs 152 and 154. Hence, switch 103 can map tags of edge VLANs 152 and 154 to global VLAN tags such that a respective global VLAN tag is distinct for datacenters 120 and 130. FIG. 2A illustrates exemplary mappings of global virtual local area networks (VLANs), in accordance with an embodiment of the present invention. An edge packet (i.e., a packet received via an edge port of a switch in network 100) can include an edge VLAN tag 202 (e.g., a C-tag). A switch maps edge VLAN tag 202 to a global VLAN tag 204. If an edge packet includes edge VLAN tag 202, the switch includes global VLAN tag 204 in the corresponding inter-switch packet in network 100.

To segregate traffic among different tenants, mapping between edge VLAN tag 202 and global VLAN tag 204 can further include a tenant identifier 216 (denoted with dotted line), which can be any information that can distinguish between tenants. Examples of tenant identifier 216 include, but are not limited to, a generated identifier, a virtual or physical MAC address, an IP address, an IP sub-network (subnet), a logical or physical port identifier, a virtual switch identifier, a hypervisor identifier, and a combination thereof. Furthermore, to distinguish between different datacenter domains, this mapping can also include a datacenter domain identifier 218 (denoted with dotted line) which can be any information that can distinguish between datacenter domains. This combination of edge VLAN tag 202, tenant identifier 216, and datacenter domain identifier 218 can be mapped to global VLAN tag 204.

In some embodiments, the inter-switch packet is a fabric-encapsulated packet. Examples of fabric encapsulation include, but are not limited to, TRILL, IP, and a combination thereof. In some embodiments, the global VLAN tag is based on Fine Grained Labeling (FGL) comprising two tag segments 212 and 214. These tag segments together represent the bits of global VLAN tag 204. FGL is described in Internet Engineering Task Force (IETF) Request for Comments (RFC) 7172, titled "Transparent Interconnection of Lots of Links (TRILL): Fine-Grained Labeling," available at http://tools.ietf.org/html/rfc7172, which is incorporated by reference herein.

In some embodiments, the switch maps global VLAN tag 204 to an internal virtual identifier (IVID) 206. Forwarding in virtualized network based on IVID is described in U.S. patent application Ser. No. 13/044,301 (Attorney Docket No. BRCD-3042.1.US.NP), titled "Flooding Packets on a Per-Virtual-Network Basis," by inventors Shunjia Yu, Anoop Ghanwani, Phanidhar Koganti, and Dilip Chatwani, filed 9 Mar. 2011, the disclosure of which is incorporated by reference herein.

When an edge packet is received by the switch via an edge port, the packet header is processed by the switch to determine the egress port, which can be either an edge port or an inter-switch port, via which the packet is to be forwarded. Oftentimes, a forwarding module of the switch (e.g., an integrated circuit specifically designed for performing forwarding lookups) is the bottleneck in the data path. Consequently, increasing the processing speed and decreasing the size and complexity of the forwarding module is usually very important. It should be noted that IVID 206 is internal and local to the switch, and is not included in a packet. For the same global VLAN tag 204, a corresponding IVID 206 can be different for different switches in network 100. In some embodiments, an IVID can also be mapped to an edge VLAN tag. This allows an egress switch to forward packets via an edge port.

In some embodiments, in addition to global VLAN tag 204, IVID 206 can be mapped to additional information 210 (denoted with dotted line), such as the port via which the packet is received and/or one or more fields (which may include the VPN identifier) in the packet. This IVID is mapped to an egress port 208 of the switch. A plurality of global VLAN tags can be mapped to the same IVID. An edge VLAN tag can also be mapped to an IVID. Upon determining IVID 206 for the packet, the switch forwards the packet via egress port 208 based on its mapping with IVID 206. The length (in terms of bits) of the IVID can be less than the combined length of the one or more fields in the packet's header, such as global VLAN tag 204, which are used for determining the IVID. This reduction in length can increase the processing speed of the forwarding module, and decrease the overall size and complexity of the implementation.

There are at least two non-obvious insights that allow the mapping of global VLAN tag 204 (and additional information) to a shorter sized IVID 206 without significantly affecting network virtualization functionality. The first non-obvious insight is that, even though a respective tenant is given the capability to create a large number of virtual networks based on global VLANs, it is unlikely that each and every tenant provisions a large number of virtual networks. For example, even though each tenant may be given the capability to create 4K VLANs using 12 bits of an edge VLAN tags, it is unlikely for a respective tenant to provision 4K VLANs. Hence, the IVID does not have to be long enough to handle cases in which a respective tenant provisions 4K VLANs. Note that the entire 4K VLAN address space is still available to a respective tenant.

The second non-obvious insight is that multiple global VLAN tags can be mapped to a single IVID. Note that a switch assigns a unique IVID for a global VLAN or an edge VLAN if the switch receives/forwards packets from/to an end device (e.g., end device 142) via an edge port. For example, an ingress switch may assign a unique IVID for a respective global VLAN whose packets are receives via an edge port. Similarly, an egress switch may assign a unique IVID for a respective edge VLAN whose packets are forwarded via an edge port. However, if the switch is not an ingress or egress switch for a set of global VLANs, the switch can map a set of global VLANs to a common "pass-through" IVID.

Figure 2B:
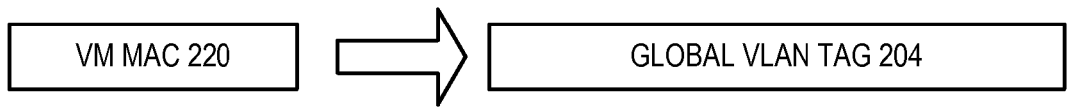
FIG. 2B illustrates exemplary direct mapping of a global VLAN to a virtual machine's media access control (MAC) address, in accordance with an embodiment of the present invention.

FIG. 2B illustrates exemplary direct mapping of a global VLAN to a virtual machine's MAC address, in accordance with an embodiment of the present invention. In some embodiments, if a virtual machine is not associated with an edge VLAN, the virtual machine can be associated with a global VLAN. If the virtual machine is not coupled to a vSwitch of a hypervisor, the virtual machine may not be associated with an edge VLAN. The MAC address 220 of the virtual machine can directly be mapped to global VLAN 204. This allows segregation of traffic from that virtual machine in network 100.

In some embodiments, the mappings in FIG. 2A are stored in tables. FIG. 2C illustrates exemplary tables comprising mappings of global VLANs, in accordance with an embodiment of the present invention. Suppose that edge VLANs 152 and 154 have edge VLAN tags 222 and 224, respectively, and datacenter domains 172 and 174 have identifiers 272 and 274, respectively. A table 252 of a switch in network 100 (e.g., switch 103) includes mappings of edge VLAN tags 222 and 224 to corresponding global VLAN tags. In some embodiments, this mapping also includes tenant identifiers and/or datacenter domain identifiers. Inclusion of this mapping allows table 252 to store mapping of edge VLAN tags associated with different tenants and datacenter domains to distinct global VLAN tags.

For example, for a tenant with tenant identifier 282 in datacenter domain 172, edge VLAN tags 222 and 224, and corresponding tenant identifier 282 and datacenter domain identifier 272, are mapped to global VLAN tags 231 and 232, respectively. Suppose that the same tenant also uses edge VLAN tag 224 in datacenter domain 174 (i.e., has edge VLAN 254 in datacenter 130). That edge VLAN tag 224, and corresponding tenant identifier 282 and datacenter domain identifier 274, is mapped to a different global VLAN tag 233. In this way, traffic from a tenant's same edge VLAN 154 at different datacenters can be segregated in network 100. It should be noted that the tenant with identifier 282 may not have edge VLAN 152 in datacenter 130.

Similarly, for a tenant with tenant identifier 284 in datacenter domain 174, edge VLAN tags 222 and 224, and corresponding tenant identifier 284 and datacenter domain identifier 274, are mapped to global VLAN tags 234 and 235, respectively. Suppose that the same datacenter domain also includes another tenant with identifier 286, which uses edge VLAN tag 224 in datacenter domain 174 (i.e., has edge VLAN 254 in datacenter 130). That edge VLAN tag 224, and corresponding tenant identifier 286 and datacenter domain identifier 274, is mapped to a different global VLAN tag 236. In this way, packets with the same edge VLAN tag 224 from different tenants within the same datacenter can be segregated in network 100. It should be noted that the tenant with identifier 286 may not have edge VLAN 152 in datacenter 130.

In some embodiments, a switch in network 100, upon generating a global VLAN tag, shares the global VLAN tag with other switches in network 100. If network 100 is a fabric switch, the switch can use internal messaging (e.g., a name service) for the fabric switch to generate a notification message. The switch then includes the generated global VLAN tag in the notification message, determines an egress port for the notification message, and transmits the notification message via the egress port. In this way, a respective switch in network 100 is aware of all global VLAN tags generated for network 100. For example, switch 103 can generate global VLAN tag 232 and switch 105 can generate global VLAN tag 236. Upon exchanging notification messages, both switches 103 and 105 have global VLAN tags 232 and 236. In some embodiments, a respective global VLAN tag is unique in network 100.

A respective global VLAN tag can be mapped to an IVID. In this example, switch 103 can store the mappings between global VLAN tags and its local IVIDs in table 254. Table 254 includes mappings of global VLAN tags 231, 232, 233, 234, 235, and 236 to IVIDs 261, 262, 263, 264, 265, and 266, respectively. These IVIDs are local and internal to switch 103 and not included in a packet. In some embodiments, some of these mappings can include additional information as well, as described in conjunction with FIG. 2A. For example, mappings of global VLAN tags 231, 232, 233, 235, and 236 include additional information 241, 242, 243, 244, and 245, respectively. However, global VLAN tag 234 is mapped to IVID 264, which does not include additional information. It should be noted that additional information for different global VLAN tags, such as additional information 241 and 242, can be different. For example, additional information 241 can represent a MAC address and additional information 242 can represent an IP address.

Similarly, switch 105 can store the mappings between global VLAN tags and its local IVIDs in table 256. Table 256 includes mappings of global VLAN tags 231, 232, 233, 234, 235, and 236 to IVIDs 267, 262, 263, 268, 261, and 269, respectively. These IVIDs are local and internal to switch 105 and not included in a packet. Mappings of global VLAN tags 231, 232, 233, 234, and 236 include additional information 241, 247, 244, 248, and 246, respectively. However, global VLAN tag 235 is mapped to IVID 261, which does not include additional information. Since these IVIDs are local and internal to switch 105, the same global VLAN tag 231 and internal information 241 are mapped to different IVIDs 261 and 267 in switch 103 and 105, respectively. Furthermore, global VLAN tag 232 is associated with different additional information 242 and 247 for switch 103 and 105, respectively. On the other hand, additional information 244 is associated with global VLAN tag 235 in switch 103 and with global VLAN tag 233 in switch 105.

In some embodiments, switch 103 can store another table (not shown in FIG. 2B), which maps IVIDs 261, 262, 263, 264, 265, and 266 to corresponding egress ports, as described in conjunction with FIG. 2A. Similarly, switch 105 can store another table (not shown in FIG. 2B), which maps IVIDs 267, 262, 263, 268, 261, and 269 to corresponding egress ports, as described in conjunction with FIG. 2A. This allows switches 103 and 105 to identify a global VLAN tag in an inter-switch packet, determine a corresponding IVID from tables 254 and 256, respectively, and determine an egress port for the packet.

In the example in FIG. 1, suppose that virtual machine 124 sends a packet toward end device 142. Since virtual machine 124 is in edge VLAN 152, the packet includes edge VLAN tag 222. Upon receiving the packet, switch 103 obtains a corresponding global VLAN tag from table 252. If virtual machine 124 is associated with a tenant with identifier 282, the switch obtains the corresponding global VLAN tag 231. Switch 103 uses global VLAN tag 231 and additional information (e.g., a MAC address) to obtain IVID 261. If network 100 is a fabric switch, switch 103 encapsulates the packet in a fabric encapsulation to create an inter-switch packet and includes global VLAN tag 231 in the inter-switch packet. This global VLAN tag can be included in fabric encapsulation header (e.g., in a TRILL or IP header), a shim header, or in the header of the inner edge packet. Since end device 142 is coupled to switch 102, the egress switch identifier of the inter-switch packet corresponds to switch 102. Switch 103 then uses IVID 261 to determine an egress port for the inter-switch packet and transmits the packet to switch 102 via the determined egress port. Upon receiving the inter-switch packet, switch 102 determines the inter-switch packet to be destined to itself, removes the fabric encapsulation to obtain the inner edge packet, and forwards the edge packet to end device 142.

Initialization

Figure 3A:
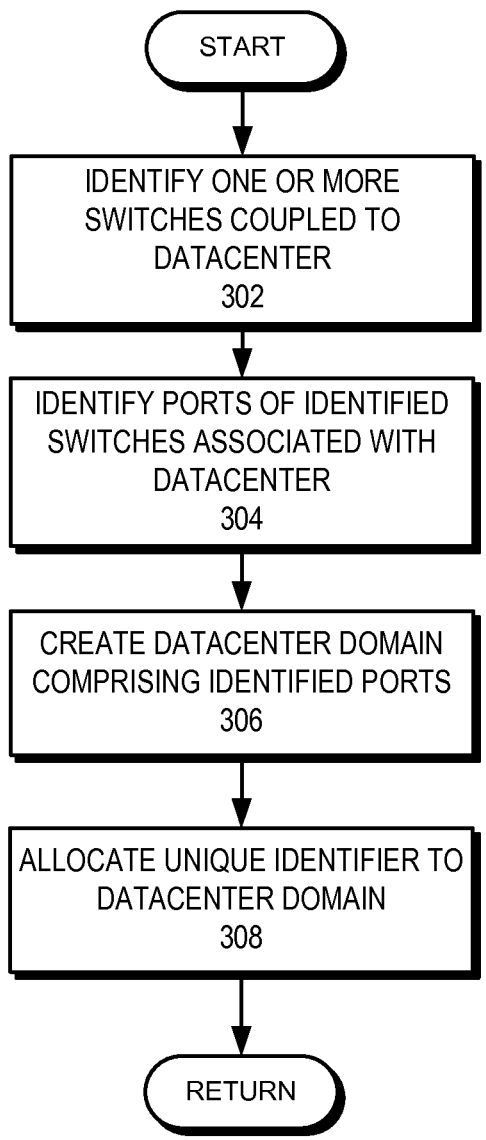
FIG. 3A presents a flowchart illustrating the process of a datacenter manager creating a datacenter domain for a datacenter, in accordance with an embodiment of the present invention.

FIG. 3A presents a flowchart illustrating the process of a datacenter manager creating a datacenter domain for a datacenter, in accordance with an embodiment of the present invention. During operation, the datacenter manager identifies one or more switches coupled to the datacenter (operation 302) and identifies ports of identified switches associated with the datacenter (operation 304). In the example in FIG. 1, the datacenter manager of datacenter 130 identifies switches 103 and 105 in operation 302, and identifies ports 162 and 164 in operation 304. The datacenter manager then creates a datacenter domain comprising the identified ports (operation 306) and allocates a unique identifier to the datacenter domain (operation 308). The operations in FIG. 3A can be repeated for a respective datacenter.

Figure 3B:
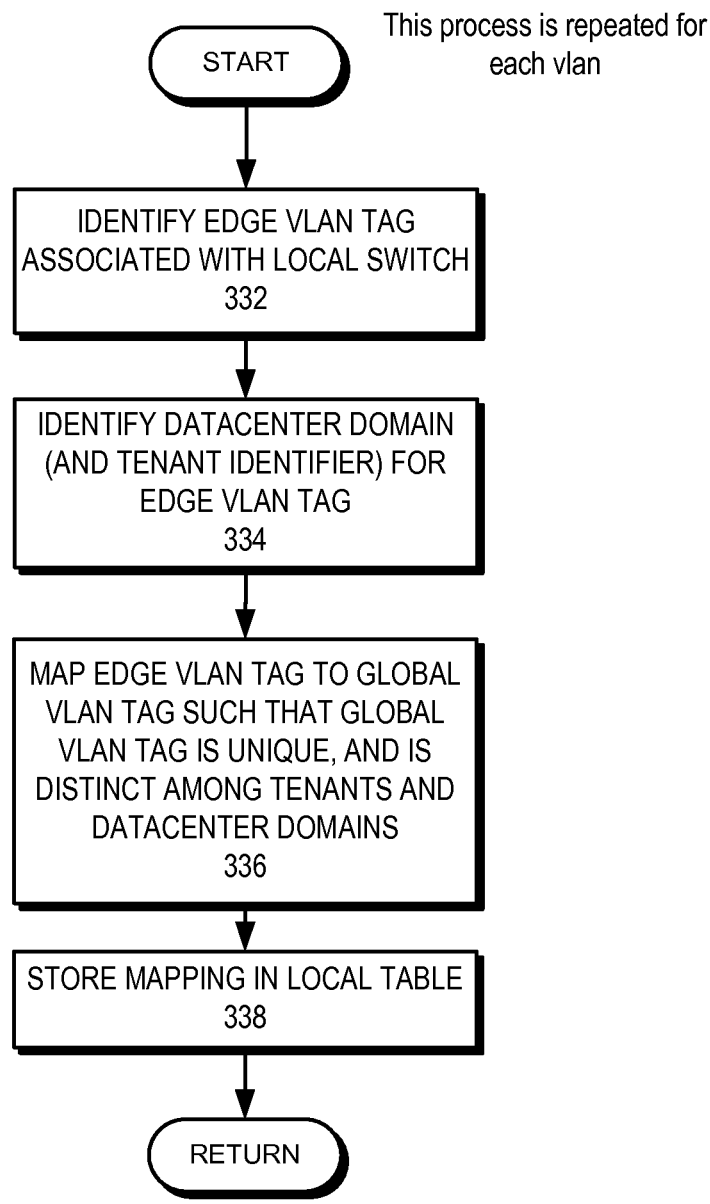
FIG. 3B presents a flowchart illustrating the process of a switch mapping an edge VLAN tag to a global VLAN tag, in accordance with an embodiment of the present invention.

FIG. 3B presents a flowchart illustrating the process of a switch mapping an edge VLAN tag to a global VLAN tag, in accordance with an embodiment of the present invention. During operation, switch identifies an edge VLAN tag associated with the local switch (operation 332). The switch identifies a datacenter domain and, optionally, a tenant identifier for the edge VLAN tag (operation 334). The switch then maps the edge VLAN tag to a global VLAN tag such that the global VLAN tag is unique, and is distinct among the tenants and datacenter domains (operation 336), as described in conjunction with FIG. 2A. The switch then stores the mapping a local table (operation 338). The switch can repeat the operations of FIG. 3B for a respective edge VLAN associated with the switch. In some embodiments, the switch can map the MAC address of a physical or virtual end device to a global VLAN if the end device is not in an edge VLAN.

Figure 3C:
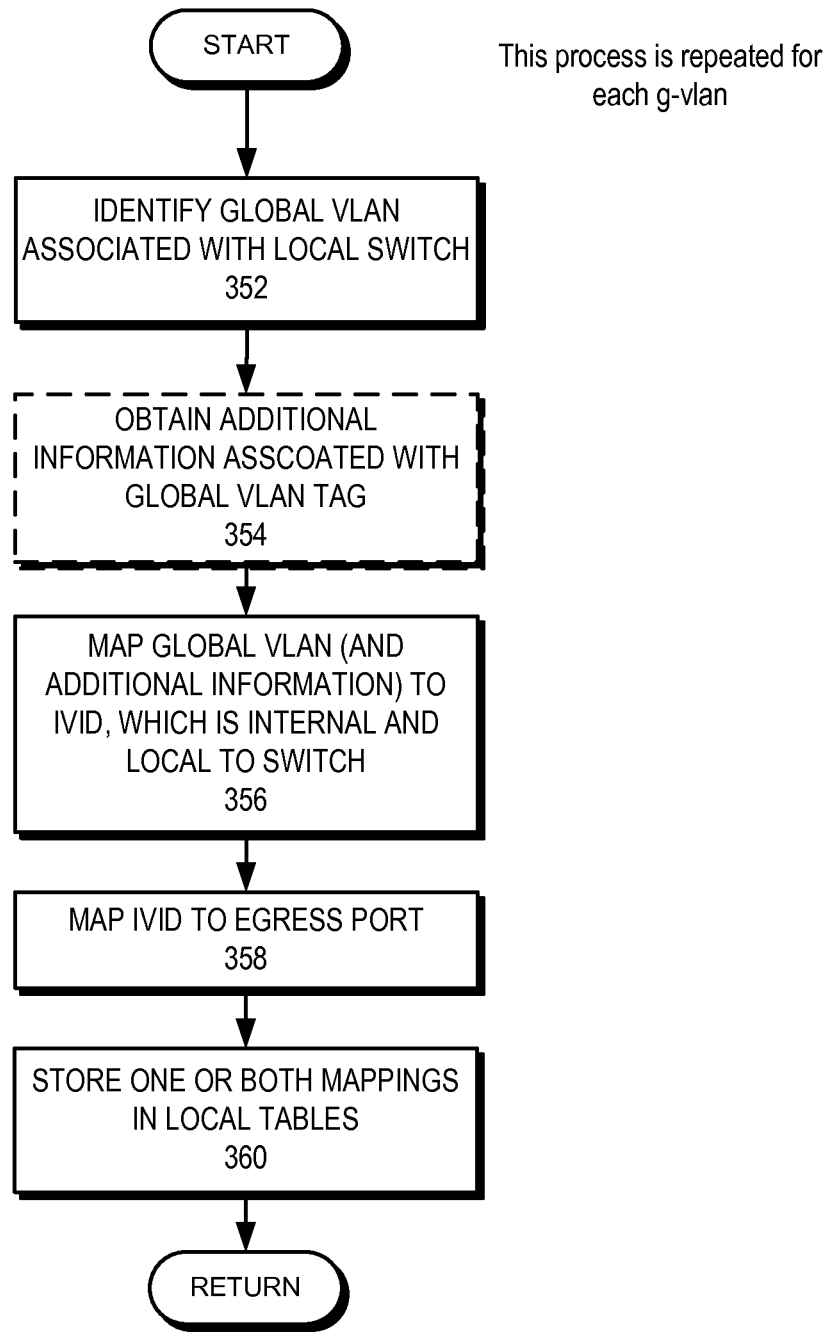
FIG. 3C presents a flowchart illustrating the process of a switch mapping a global VLAN to an internal virtual identifier (IVID), in accordance with an embodiment of the present invention.

FIG. 3C presents a flowchart illustrating the process of a switch mapping a global VLAN to an IVID, in accordance with an embodiment of the present invention. During operation, the switch identifies a global VLAN tag associated with the local switch (operation 352). The switch, optionally, obtains additional information associated with the global VLAN tag (operation 354) (denoted with dashed lines), and maps the global VLAN tag (and additional information) to an IVID, which is internal and local to the switch (operation 356). It should be noted that the mapping may not include additional information, as described in conjunction with FIG. 2B. A plurality of global VLAN tags can be mapped to the same IVID. The switch can further map the IVID to an egress port (operation 358). The switch stores one or both mappings in local tables (operation 360).

Packet Forwarding

Figure 4A:
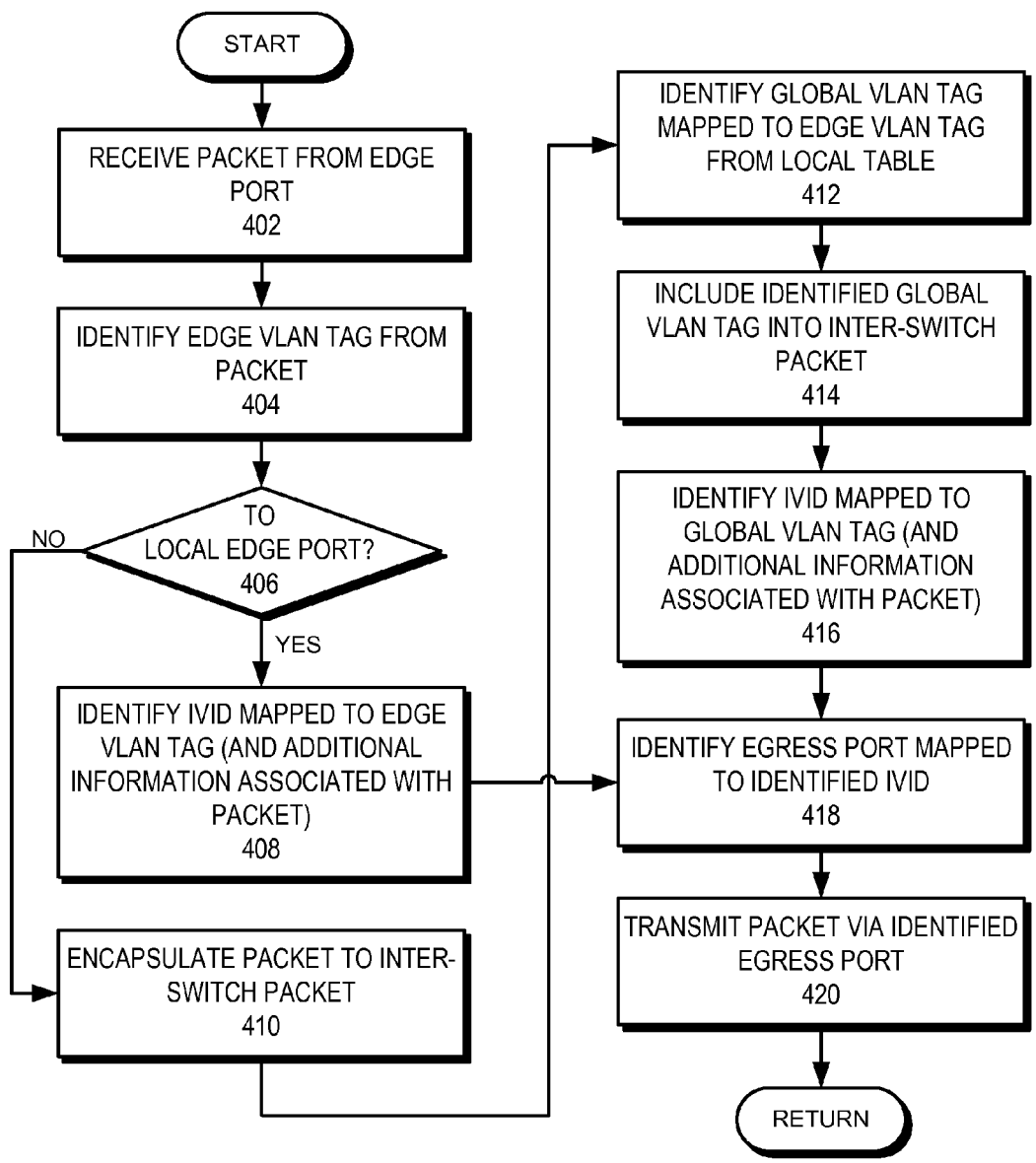
FIG. 4A presents a flowchart illustrating the process of a switch forwarding a packet received from an edge port based on scalable and segregated network virtualization, in accordance with an embodiment of the present invention.

FIG. 4A presents a flowchart illustrating the process of a switch forwarding a packet received from an edge port based on scalable and segregated network virtualization, in accordance with an embodiment of the present invention. During operation, the switch receives a packet from an edge port (operation 402) and identifies an edge VLAN tag from the packet (operation 404). The switch checks whether the packet is destined to a local edge port (operation 406). If the packet is destined to a local edge port, the switch identifies an IVID mapped to an edge VLAN tag (and additional information associated with the packet) (operation 408). If not (i.e., if the packet is destined to an inter-switch port), the switch encapsulates the packet to an inter-switch packet (operation 410). If the switch is a member switch of a fabric switch, the switch can use fabric encapsulation (e.g., TRILL or IP encapsulation) to create the inter-switch packet.

The switch identifies a global VLAN tag mapped to edge VLAN tag from a local table (operation 412), as described in conjunction with FIG. 2B. The switch includes the global VLAN tag in the inter-switch packet (operation 414) and identifies an IVID mapped to the global VLAN tag (and additional information associated with the packet) (operation 416). Based on the identified IVID (operation 408 or 416), the switch identifies an egress port mapped to the identified IVID (operation 418) and transmits the packet via the identified egress port (operation 420).

Figure 4B:
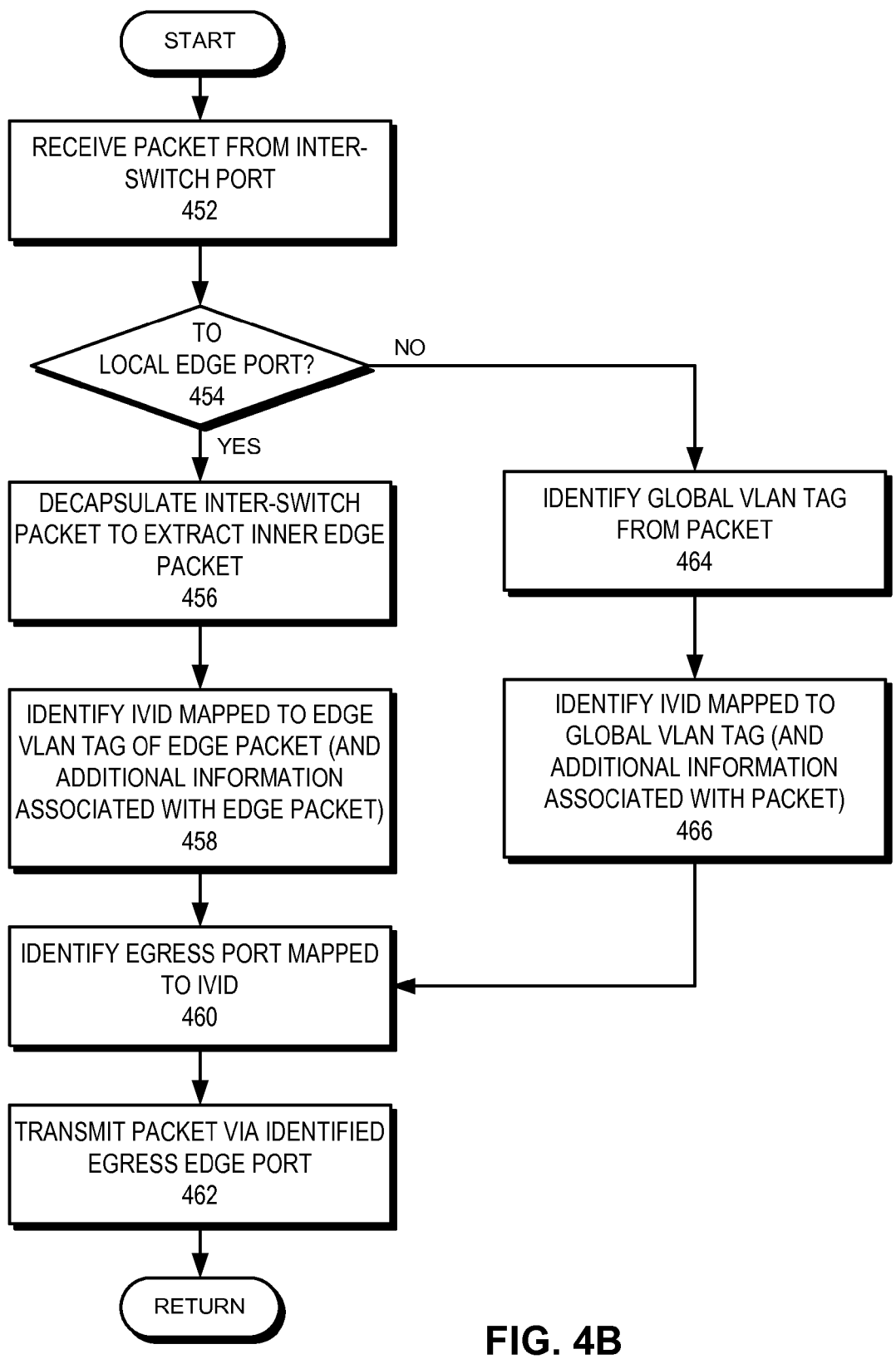
FIG. 4B presents a flowchart illustrating the process of a switch forwarding a packet received from an inter-switch port based on scalable and segregated network virtualization, in accordance with an embodiment of the present invention.

FIG. 4B presents a flowchart illustrating the process of a switch forwarding a packet received from an inter-switch port based on scalable network virtualization, in accordance with an embodiment of the present invention. During operation, the switch receives a packet from the inter-switch port (operation 452). The switch checks whether the packet is destined to a local edge port (operation 454). If the packet is destined to a local edge port, the switch decapsulates the inter-switch packet to extract the inner edge packet (operation 456) and identifies an IVID mapped to an edge VLAN tag of the edge packet (and additional information associated with the edge packet) (operation 458).

If not (i.e., if the packet is destined to an inter-switch port), the switch identifies a global VLAN tag from the packet (operation 464) and identifies an IVID mapped to the global VLAN tag (and additional information associated with the packet) (operation 466). Based on the identified IVID (operation 458 or 466), the switch identifies an egress port mapped to the identified IVID (operation 460) and transmits the packet via the identified egress port (operation 462).

Port Profiles

A port profile which specifies a set of port configuration information and allows dynamically provisioning a port, specifically for a virtual machine. A port profile can be created for that virtual machine, which is moved to a corresponding switch port as the virtual machine moves in the network. A fabric switch can quickly detect when a virtual machine moves to a new location. The port profile corresponding to the virtual machine can then be automatically applied to the new location (i.e., the new physical switch port to which the virtual machine couples). This way, the network can respond quickly to the dynamic location changes of virtual machines. Port profiles are described in U.S. patent application Ser. No. 13/042,259, titled "Port Profile Management for Virtual Cluster Switching," by inventors Dilip Chatwani, Suresh Vobbilisetty, and Phanidhar Koganti, filed 7 Mar. 2011, the disclosure of which is incorporated by reference herein.

A port profile can contain the entire configuration needed for a virtual machine to gain access to a LAN or WAN, which can include: Fibre Channel over Ethernet (FCoE) configuration, VLAN configuration, QoS related configuration, and security related configuration, such as access control lists (ACLs). The list above is by no means complete or exhaustive. Furthermore, it is not necessary that a port profile contains every type of configuration information.

In one embodiment, a port profile can be capable of operating as a self contained configuration container. In other words, if a port profile is applied to a new switch without any additional configuration, the port profile should be sufficient to set the switch's global and local (interface level) configuration and allow the switch to start carrying traffic.

A VLAN configuration profile within a port profile can define:
  a. edge VLAN membership which includes tagged VLANs and an untagged VLAN;
  b. global VLAN membership which includes mappings of global VLANs; and
  c. ingress/egress VLAN filtering rules based on the VLAN membership.

A QoS configuration profile within a port profile can define:
  d. mapping from an incoming frame's 802.1p priority to internal queue priority; (if the port is in QoS untrusted mode, all incoming frame's priorities would be mapped to the default best-effort priority)
  e. mapping from an incoming frame's priority to outgoing priority;
  f. scheduling profile, such as weighted Round-Robin or strict-priority based queuing;
  g. mapping of an incoming frame's priority to strict-priority based or weighted Round-Robin traffic classes;
  h. flow control mechanisms on a strict-priority based or weight Round-Robin traffic class; and
  i. limitations on multicast datarate.

An FCoE configuration profile within a port profile defines the attributes needed for the port to support FCoE, which can include:
  j. FCoE VLAN;
  k. FCMAP;
  l. FCoE Priority; and
  m. virtual Fabric ID.

A security configuration profile within a port profile defines the security rules needed for the server port. However, the security rules can be different at different ports, so some of the locally configured ACLs can be allowed to override conflicting rules from a port profile. A typical security profile can contain the following attributes:

n. Enable 802.1x with EAP TLV extensions for VM mobility; and o. MAC based standard and extended ACLs.

Figure 5A:
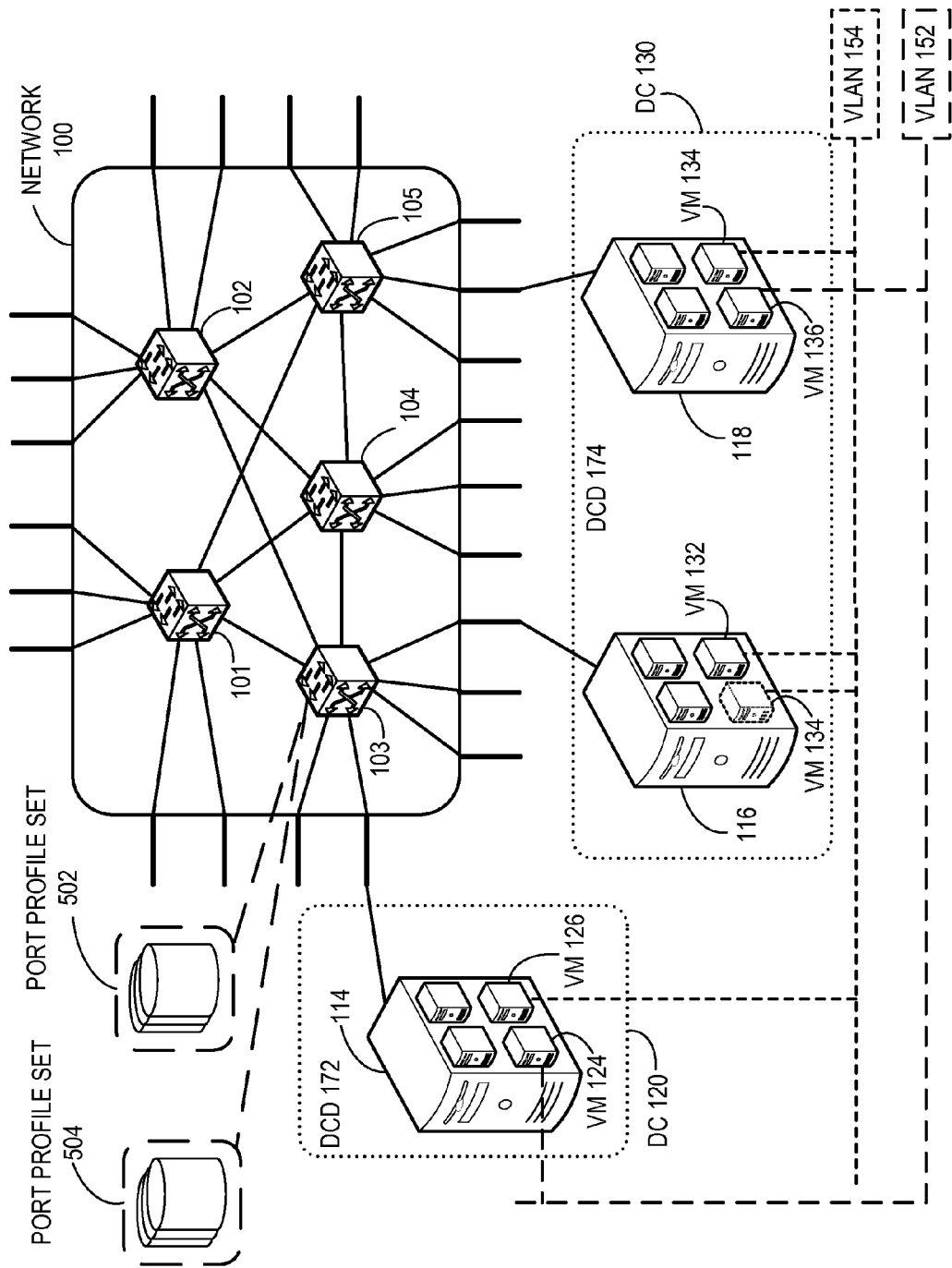
FIG. 5A illustrates an exemplary provider network with port profile sets for scalable and segregated network virtualization, in accordance with an embodiment of the present invention.

FIG. 5A illustrates an exemplary provider network with port profile sets for scalable and segregated network virtualization, in accordance with an embodiment of the present invention. In this example, a switch segregates port profiles for a respective datacenter domain. During operation, switch 103 obtains port profile sets 502 and 504 for datacenters 120 and 130, respectively. In this way, the port profiles for virtual machines 124 and 126 are in port profile set 502. Similarly, the port profiles for virtual machines 132 and 134 are in port profile set 504, which is segregated from port profile set 502. To ensure segregation, port profile set 502 is not shared in datacenter 130, and port profile set 504 is not shared in datacenter 120.

Figure 5B:
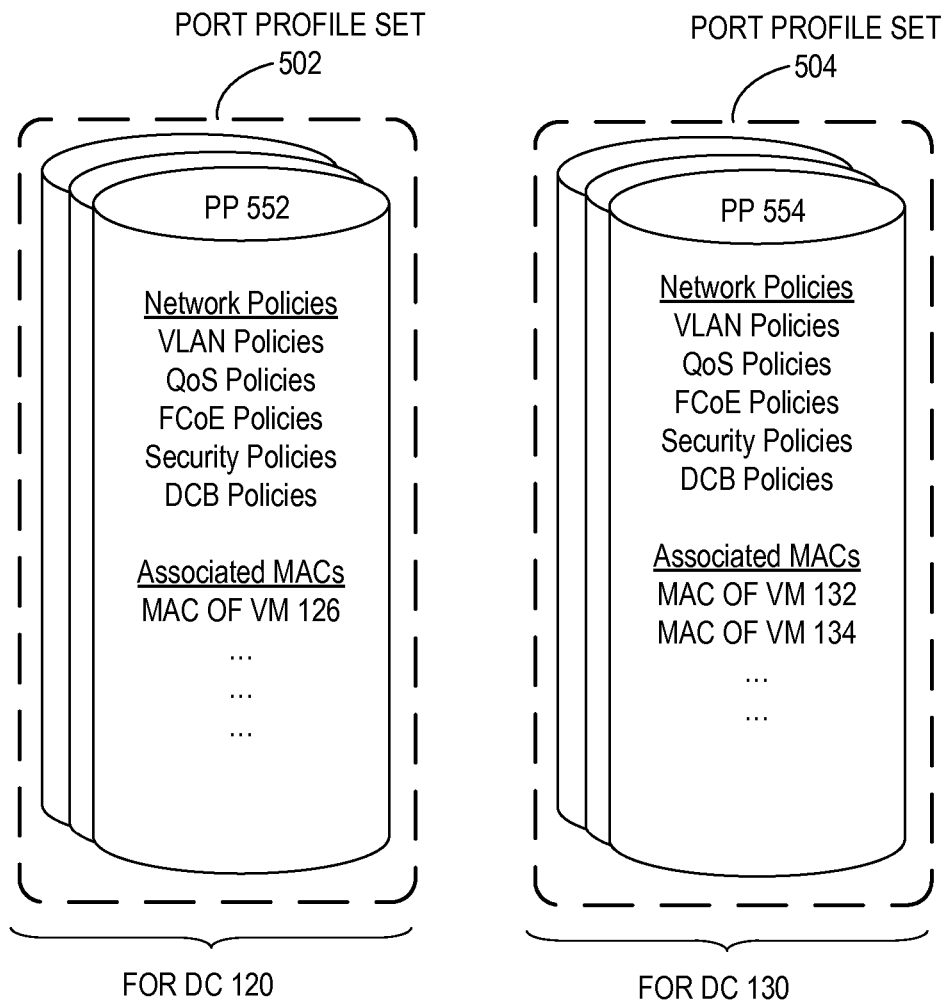
FIG. 5B illustrates exemplary port profile sets for scalable and segregated network virtualization, in accordance with an embodiment of the present invention.

In one embodiment, each port profile can have one or more MAC addresses associated with it. FIG. 5B illustrates exemplary port profile sets for scalable and segregated network virtualization, in accordance with an embodiment of the present invention. In this example, port profile set 502 includes one or more port profiles. Port profile set 502 includes port profile 552, which is associated with one or more MAC addresses. These MAC address can be virtual MAC addresses assigned to different virtual machines, such as the MAC address of virtual machine 126. This port-profile-to-MAC address mapping information can be included in port profile 552, or can be maintained outside of port profile 552 (e.g., in a separate table). Port profile set 502 is distributed throughout network 100. A port profile can be activated for a port in three ways: (1) when a hypervisor binds a MAC address to a port profile identifier; (2) through regular MAC learning; and (3) through a manual configuration process via a management interface.

In this example, port profile set 504 includes one or more port profiles. Port profile set 504 includes port profile 554, which is associated with one or more MAC addresses. These MAC address can be virtual MAC addresses assigned to different virtual machines, such as the MAC addresses of virtual machines 132 and 134. This port-profile-to-MAC address mapping information can be included in port profile 554, or can be maintained outside of port profile 554 (e.g., in a separate table). A set of virtual machines can be grouped in network 100 by associating them with one port profile. This group can be used to dictate forwarding between the virtual machines.

Figure 6A:
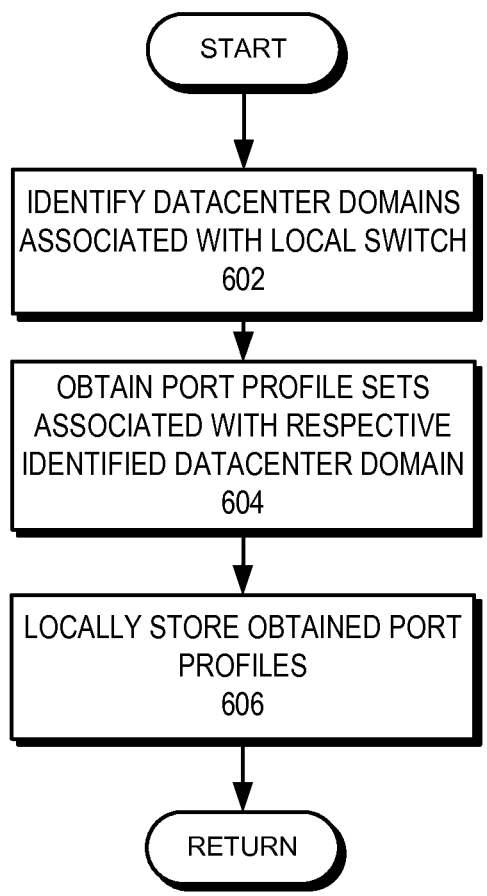
FIG. 6A presents a flowchart illustrating the process of a switch obtaining port profile sets associated with datacenters associated with the switch, in accordance with an embodiment of the present invention.

FIG. 6A presents a flowchart illustrating the process of a switch obtaining port profile sets associated with datacenters associated with the switch, in accordance with an embodiment of the present invention. During operation, the switch identifies the datacenter domains associated with the local switch (operation 602). The switch then obtains port profile sets associated with a respective datacenter domain (operation 604). A switch can obtain the port profile sets from a user (e.g., via a message from an administrative station, a command line interface (CLI) command, or a web interface). A switch can also received the port profiles from a user and generate the corresponding port profile sets based on a datacenter domain. The switch then locally stores the port profile sets (operation 606)

Figure 6B:
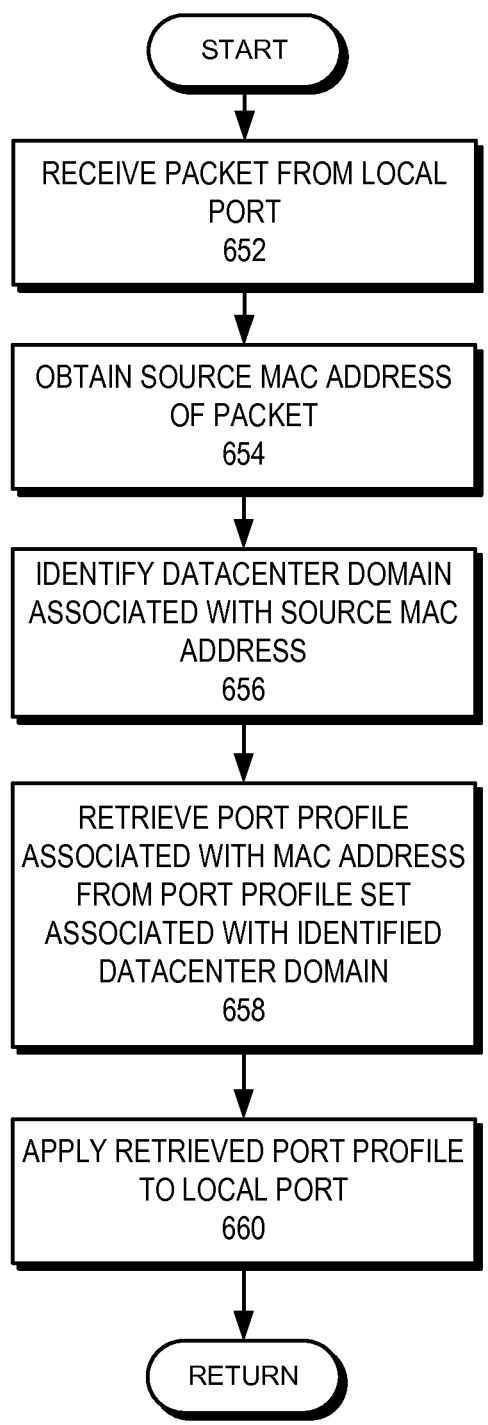
FIG. 6B presents a flowchart illustrating the process of a switch applying a port profile from a port profile set based on a received packet, in accordance with an embodiment of the present invention.

FIG. 6B presents a flowchart illustrating the process of a switch applying a port profile from a port profile set based on a received packet, in accordance with an embodiment of the present invention. During operation, the switch receives a packet from a local port (operation 652). The switch then obtains the source MAC address of the packet (operation 654) and identifies the datacenter domain associated with the source MAC address (operation 656). In some embodiments, the switch identifies the datacenter domain based on the ingress port via which the packet has been received (i.e., identifies the datacenter domain associated with the ingress port of the packet). The switch retrieves the port profile associated with the MAC address from the port profile set associated with the identified datacenter domain (operation 658). The switch then applies the received port profile to the local port (i.e., the ingress port of the packet) (operation 660).

Exemplary Switch

Figure 7:
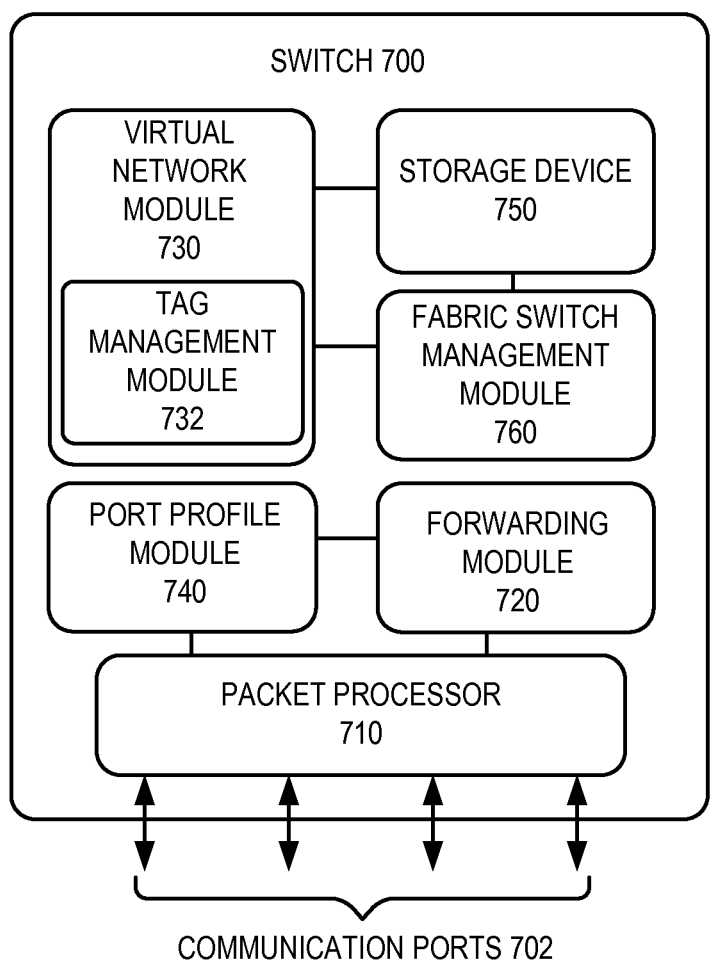
FIG. 7 illustrates an exemplary architecture of a switch scalable and segregated network virtualization support, in accordance with an embodiment of the present invention.

FIG. 7 illustrates an exemplary architecture of a switch scalable and segregated network virtualization support, in accordance with an embodiment of the present invention. In this example, a switch 700 includes a number of communication ports 702, a packet processor 710, a virtual network module 730, a forwarding module 720, and a storage device 750. Packet processor 710 extracts and processes header information from the received frames.

In some embodiments, switch 700 may maintain a membership in a fabric switch, as described in conjunction with FIG. 1A, wherein switch 700 also includes a fabric switch management module 760. Fabric switch management module 760 maintains a configuration database in storage device 750 that maintains the configuration state of every switch within the fabric switch. Fabric switch management module 760 maintains the state of the fabric switch, which is used to join other switches. In some embodiments, switch 700 can be configured to operate in conjunction with a remote switch as an Ethernet switch.

Communication ports 702 can include inter-switch communication channels for communication within a fabric switch. This inter-switch communication channel can be implemented via a regular communication port and based on any open or proprietary format. Communication ports 702 can include one or more TRILL ports capable of receiving frames encapsulated in a TRILL header. Communication ports 702 can also include one or more IP ports capable of receiving IP packets. An IP port is capable of receiving an IP packet and can be configured with an IP address. Packet processor 710 can process TRILL-encapsulated frames and/or IP packets.

During operation, virtual network module 730 includes a global VLAN tag in a packet received via an ingress port among communication ports 702. Forwarding module 720 identifies an egress port among communication ports 702 for the packet based on the global VLAN tag. In some embodiments, switch 700 also includes a tag management module 732, which generates the global VLAN tag based on the datacenter domain and the edge VLAN tag. Fabric switch management module 760 can include the generated global VLAN tag in a notification message for the member switches of the fabric switch. In some embodiments, switch 700 also includes a port profile module 740, which applies a port profile to the ingress port of the packet in response to identifying the source MAC address of the packet in a port profile. This port profile can be in a port profile set associated with a corresponding data center domain.

Note that the above-mentioned modules can be implemented in hardware as well as in software. In one embodiment, these modules can be embodied in computer-executable instructions stored in a memory, which is coupled to one or more processors in switch 700. When executed, these instructions cause the processor(s) to perform the aforementioned functions.

In summary, embodiments of the present invention provide a switch and a method for facilitating scalable and segregated network virtualization. In one embodiment, the switch includes a virtual network module and a forwarding module. The virtual network module includes a global VLAN tag in a packet. The global VLAN tag is mapped to an edge VLAN tag in the packet and is associated with a datacenter domain. The datacenter domain indicates a set of ports associated with a datacenter. The forwarding module identifies an egress edge port for the packet based on the global VLAN tag.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   a plurality of ports;
   a storage device configured to store a data structure, which comprises an entry mapping a global virtual local area network (VLAN) tag to an edge VLAN tag and a datacenter domain identifier, wherein the datacenter domain identifier indicates a set of ports configured for a datacenter, and wherein the edge VLAN tag identifies a virtual network of a tenant in the datacenter and the global VLAN tag identifies a global virtual network distinct among tenants and datacenter domains; and
   forwarding circuitry configured to encapsulate a packet comprising the edge VLAN tag with an encapsulation header based on the entry, wherein the encapsulation header includes the global VLAN tag; and
   forwarding circuitry configured to identify, from the plurality of ports, an egress port for the packet based on the global VLAN tag.

2. The switch of claim 1, wherein the storage device is further configured to store a second data structure, which maps the global VLAN tag to an internal virtual identifier, which is internal and local to the switch; and
   wherein the forwarding circuitry is further adapted to identify the egress edge port based on a third data structure mapping the egress port to the internal virtual identifier.

3. The switch of claim 1, wherein the edge VLAN tag is associated with a virtual machine; and
   wherein migration of the virtual machine is restricted to the set of ports indicated by the datacenter domain.

4. The switch of claim 1,
   wherein the storage device is further configured to store a fourth data structure, which maps the global VLAN tag to a media access control (MAC) address in a second packet, and wherein the second packet does not include an edge VLAN tag.

5. The switch of claim 1, wherein the data structure further maps the global VLAN tag to a tenant identifier, which is information that can distinguish between tenants.

6. The switch of claim 1, further comprising tag management circuitry configured to generate the global VLAN tag based on the datacenter domain and the edge VLAN tag.

7. The switch of claim 1, further comprising fabric switch management circuitry configured to maintain a membership in a network of interconnected switches, wherein the network of interconnected switches is identified by a fabric identifier.

8. The switch of claim 7, wherein the fabric switch management circuitry is further configured to include the global VLAN tag in a notification message for the member switches of network of interconnected switches.

9. The switch of claim 1, further comprising port profile circuitry configured to apply a port profile to an ingress port, in the plurality of ports, of the packet in response to identifying the source MAC address of the packet in a port profile, wherein the port profile specifies a set of port configuration information for a port of the switch.

10. The switch of claim 9, wherein the port profile is in a set of port profiles associated with the datacenter domain.

11. A computer-executable method, comprising:
    storing, in a storage device of a switch, a data structure, which comprises an entry mapping a global virtual local area network (VLAN) tag to an edge VLAN tag and a datacenter domain identifier, wherein the datacenter domain identifier indicates a set of ports configured for a datacenter, and wherein the edge VLAN tag identifies a virtual network of a tenant in the datacenter and the global VLAN tag identifies a global virtual network distinct among tenants and datacenter domains;
    encapsulating a packet comprising the edge VLAN tag with an encapsulation header based on the entry, wherein the encapsulation header includes the global VLAN; and
    identifying an egress port for the packet based on the global VLAN tag.

12. The method of claim 11, further comprising:
    storing, in the storage device, a second data structure, which maps the global VLAN tag to an internal virtual identifier, which is internal and local to the switch; and
    identifying the egress edge port based on a third data structure mapping the egress port to the internal virtual identifier.

13. The method of claim 11, wherein the edge VLAN tag is associated with a virtual machine; and
    wherein migration of the virtual machine is restricted to the set of ports indicated by the datacenter domain.

14. The method of claim 11,
    wherein the method further comprises storing, in the storage device, a fourth data structure, which maps the global VLAN tag to a media access control (MAC) address in a second packet, and wherein the second packet does not include an edge VLAN tag.

15. The method of claim 11, wherein the data structure further maps the global VLAN tag to a tenant identifier, which is information that can distinguish between tenants.

16. The method of claim 11, further comprising generating the global VLAN tag based on the datacenter domain and the edge VLAN tag.

17. The method of claim 11, further comprising maintaining a membership in a network of interconnected switches, wherein the network of interconnected switches is identified by a fabric identifier.

18. The method of claim 17, further comprising including the global VLAN tag in a notification message for the member switches of the network of interconnected switches.

19. The method of claim 11, further comprising applying a port profile to an ingress port, which belongs to the switch, of the packet in response to identifying the source MAC address of the packet in a port profile, wherein the port profile specifies a set of port configuration information for a port of the switch.

20. The method of claim 19, wherein the port profile is in a set of port profiles associated with the datacenter domain.

21. A computing system, comprising:
a plurality of ports;
a storage device;
a processor; and
a non-transitory computer-readable storage medium storing instructions which when executed by the processor causes the processor to perform a method, the method comprising:
storing, in the a storage device, a data structure, which comprises an entry mapping a global virtual local area network (VLAN) tag to an edge VLAN tag and a datacenter domain identifier, wherein the datacenter domain identifier indicates a set of ports configured for a datacenter, and wherein the edge VLAN tag identifies a virtual network of a tenant in the datacenter and the global VLAN tag identifies a global virtual network distinct among tenants and datacenter domains; and
encapsulating a packet comprising the edge VLAN tag with an encapsulation header based on the entry, wherein the encapsulation header includes the global VLAN tag; and
identifying an egress port, from the plurality of ports, for the packet based on the global VLAN tag.

22. The computing system of claim 21, wherein the method further comprises:
storing, in the storage device, a second data structure, which maps the global VLAN tag is mapped to an internal virtual identifier, which is internal and local to the switch; and
identifying the egress edge port based on a third data structure mapping the egress port to the internal virtual identifier.

23. The computing system of claim 21,
wherein the method further comprises storing, in the storage device, a fourth data structure, which maps the global VLAN tag to a media access control (MAC) address in a second packet, and wherein the second packet does not include an edge VLAN tag.

24. The computing system of claim 21, wherein the method further comprises maintaining a membership in a network of interconnected switches, wherein the network of interconnected switches is identified by a fabric identifier.

25. The computing system of claim 24, wherein the method further comprises applying a port profile to an ingress port, in the plurality of ports, of the packet in response to identifying the source MAC address of the packet in a port profile, wherein the port profile specifies a set of port configuration information for a port of the switch.

* * * * *